No. 756,698. PATENTED APR. 5, 1904.
O. A. POIRIER.
BEARING FOR DISK DRILLS.
APPLICATION FILED SEPT. 15, 1903.
NO MODEL. 2 SHEETS—SHEET 1.

WITNESSES
INVENTOR
OCTAVE A POIRIER
BY
HIS ATTORNEYS

No. 756,698. PATENTED APR. 5, 1904.
O. A. POIRIER.
BEARING FOR DISK DRILLS.
APPLICATION FILED SEPT. 15, 1903.
NO MODEL. 2 SHEETS—SHEET 2.
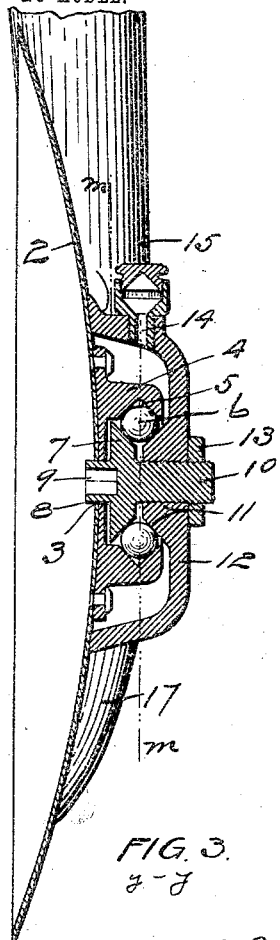
FIG. 3.
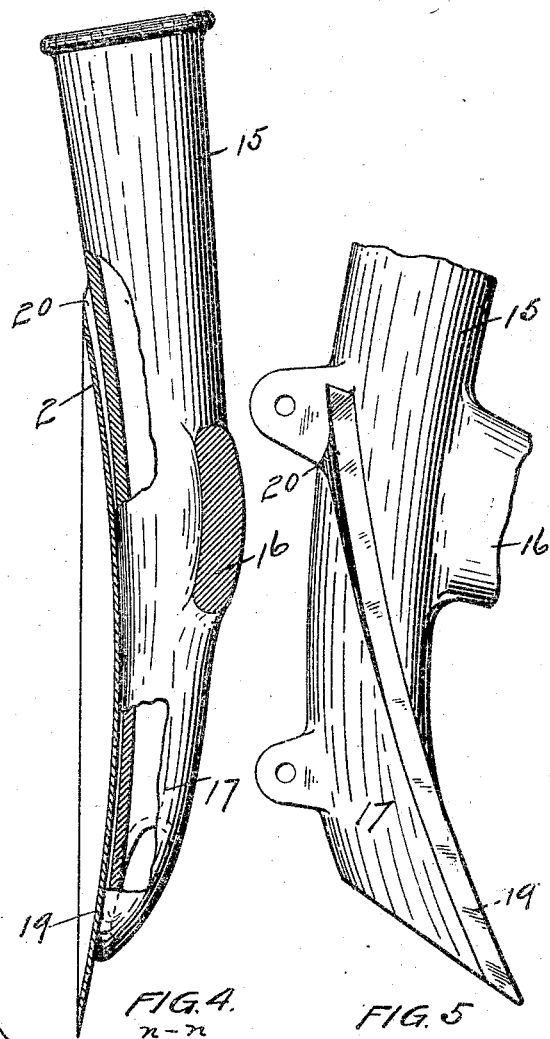
FIG. 4.
FIG. 5.
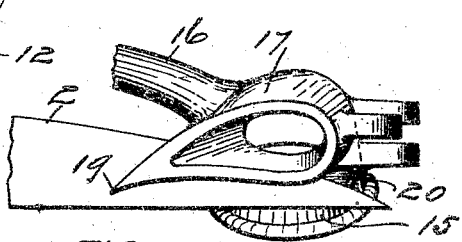
FIG. 6.
FIG. 7.
WITNESSES
INVENTOR
OCTAVE A. POIRIER
BY Paul Paul
HIS ATTORNEYS No. 756,698. Patented April 5, 1904.

UNITED STATES PATENT OFFICE.

OCTAVE A. POIRIER, OF GLADSTONE, MINNESOTA.

BEARING FOR DISK DRILLS.

SPECIFICATION forming part of Letters Patent No. 756,698, dated April 5, 1904.

Application filed September 15, 1903. Serial No. 173,281. (No model.)

*To all whom it may concern:*

Be it known that I, OCTAVE A. POIRIER, of Gladstone, county of Ramsey, State of Minnesota, have invented certain new and useful Improvements in Bearings for Disk Drills, of which the following is a specification.

The object of my invention is to provide a bearing for single-disk drills which will be of simple and economical construction and practically dust-proof.

A further object is to provide means for keeping the surfaces of the disk free from mud and dirt.

Other objects of the invention will appear from the following detailed description.

The invention consists generally in various constructions and combinations, all as hereinafter described, and particularly pointed out in the claims.

Figure 1:
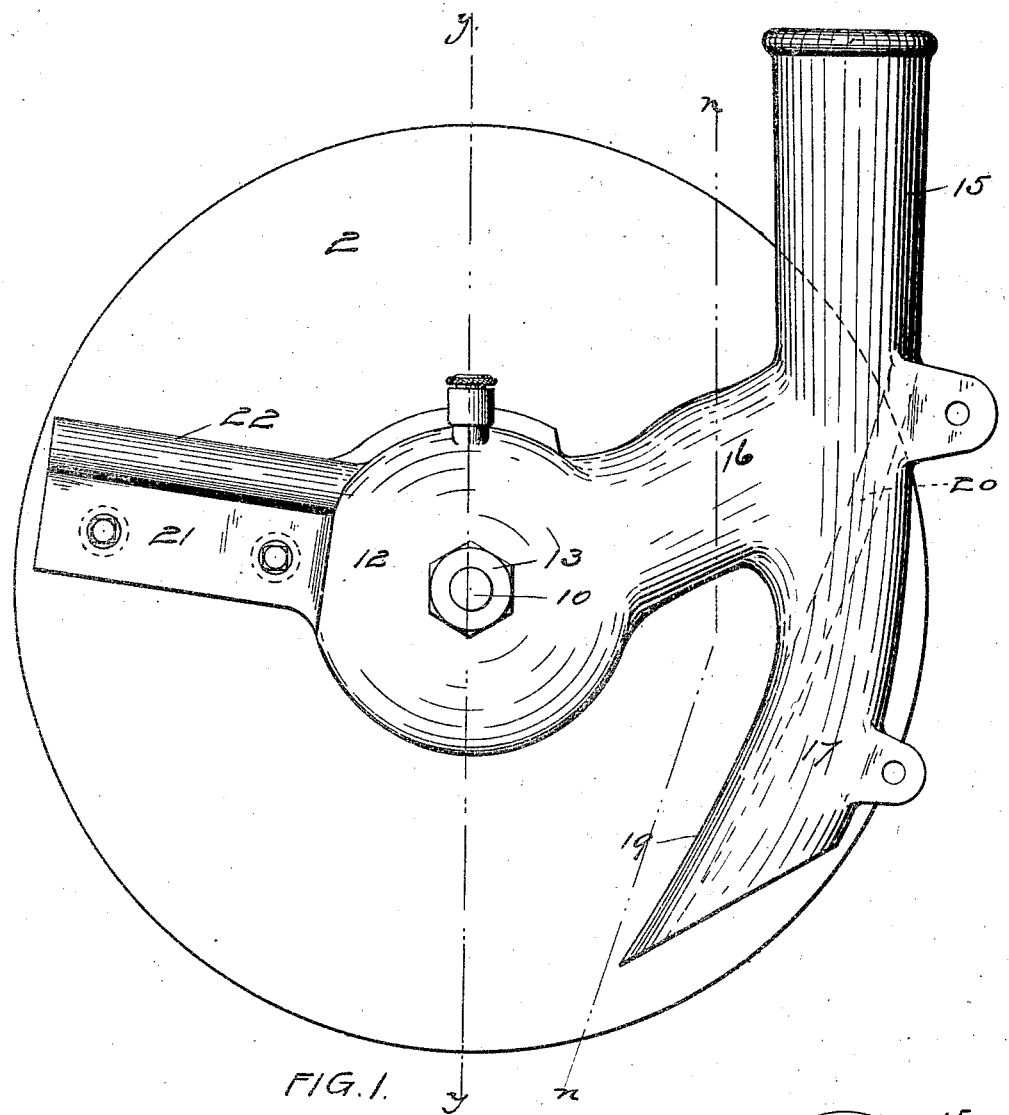
Figure 2:
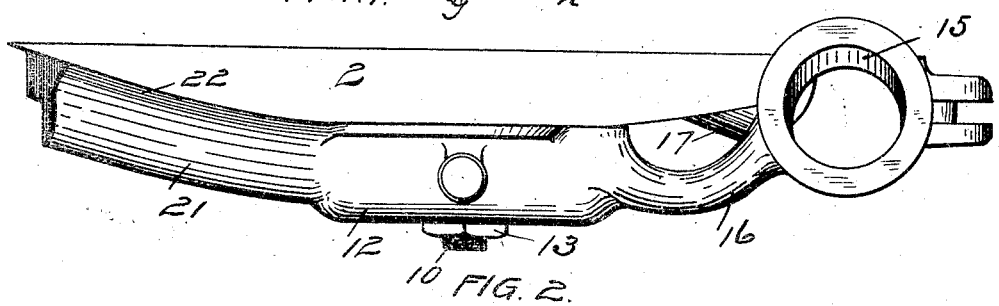

In the accompanying drawings, forming part of this specification, Figure 1 is a side elevation of a disk and boot embodying my invention. Fig. 2 is a top view of the same. Fig. 3 is a vertical section on the line $y\ y$ of Fig. 1. Fig. 4 is a similar view on the line $n\ n$ of Fig. 1. Fig. 5 is a view of the back side of the boot, showing the cleaner edges thereon. Fig. 6 is a sectional view of the bearing on the line $m\ m$ of Fig. 3. Fig. 7 is a bottom view showing the relative position of the cleaning edges on the lower portion of the boot.

In the drawings, 2 represents a drill-disk of the single type having a centrally-arranged hole 3, over which a cup 4, having an interiorly-arranged runway 5, is secured. A series of balls 6 are arranged in said runway, and a movable cone-bearing 7 is provided between said balls and the drill-disk and has an extension 8 on one side projecting through the hole 3 and provided with a socket 9, that is square in cross-section and adapted to receive a similarly-shaped key, by means of which said cone 7 is revolved. The other side of the cone 7 is provided with a threaded stud 10, that fits in a threaded opening in a fixed cone-bearing 11, that is provided on the inside of a cap 12, arranged to cover the cup 4 and conceal the same. The end of the stud 10 projects out through the wall of the cap 12 and is provided with a lock-nut 13, by means of which the movable cone 7 when properly adjusted can be locked securely in place. An oil-opening 14 is preferably provided in the upper portion of the cap 12, through which a supply of oil may be delivered to the ball-bearing. The cap 12 is preferably formed integrally with the drill-boot 15, that is provided with the usual grain-spout connected with the cap 12 by a curved wall 16, which, as shown in Fig. 2, is some little distance from the surface of the disk to allow the dirt that is carried up by the disk to fall down between them. At the lower portion of the boot I prefer to provide an extension 17 of the grain-spout, having a longitudinally-arranged cleaning edge 19, adapted to keep the disk-surface clean of mud and dirt that accumulates thereon, and at the upper end of the edge 19 I provide a similar edge 20, forming an extension of the edge 19, but oppositely inclined to conform to the change in direction of travel of the disk. In front of the cap 12 is an arm 21, having a cleaning edge 22, that is adapted to bear on the surface of the disk on its down side and clean off any accumulation of dirt that may have escaped the cleaning edges on the up side of the disk. The disk drag-bar (not shown in the drawings) is connected to the arm 21 by bolts or other suitable means.

The manner of using my improved single-disk drill is as follows: The cup 4 having been secured on the surface of the disk, the movable cone 7 is placed therein and the disk mounted on the boot. By means of the socket in the end of the extension 8 the operator can readily adjust the movable cone so that the disk will turn with proper freedom in its bearing, and when the proper adjustment has been made the movable cone is locked by means of the lock-nut 13, and the device is ready for use. The cleaning edges on the boot will keep the surface of the disk free from mud and dirt, so that its edge will be clean and bright to enter the soil the desired depth.

I claim as my invention—

1. The combination, with a drill-disk, of a cap secured thereon and having a fixed cone, a movable cone interposed between said fixed cone and said disk, a ball-runway, and balls arranged in said runway between said cones.

2. The combination, with a drill-disk having a central opening, of a cap arranged thereover, a fixed and movable cone, the latter having an extension provided with a socket projecting through said opening, and balls interposed between said cones.

3. The combination, with a drill-disk having a central opening, of a cup secured thereover, a movable cone having an extension provided with a socket projecting through said hole, a threaded stud provided on the other side of said cone, a cap having a threaded hole to receive said stud, a lock-nut for said stud, and bearing-balls interposed between said cones.

4. The combination, with a drill-disk, of a cap fitting the convex surface thereof, fixed and movable cones, a runway secured to said disk, and bearing-balls arranged in said runway between said cones.

5. A bearing for a single-disk drill comprising a ball-runway secured to the surface of the disk, a movable cone adjustably arranged in said runway, a boot provided with a cap covering said cone and runway, a fixed cone provided on said cap, and bearing-balls interposed between said cones.

6. The combination, with a drill-disk having a central opening, of a cup having a ball-runway secured over said opening, a movable cone arranged in said cup and having an extension provided with a squared socket projecting through said opening, a threaded stud provided on the other side of said cone, a boot having a cap covering said cone and runway, a fixed cone carried by said cap and having a threaded hole to receive said stud, a lock-nut provided on said stud, and bearing-balls arranged in said runway between said cones.

7. The combination, with a drill-disk, of a boot having a depending extension, and cleaner edges provided on said extension and arranged to bear upon the surface of said disk.

8. The combination, with a drill-disk, of a boot having oppositely-inclined cleaner edges substantially in line with each other.

9. The combination, with a drill-disk, of a boot having a longitudinally-arranged cleaning edge adapted to bear upon the surface of said disk.

10. The combination, with a disk drill and its bearing, of a cap concealing said bearing, a drill-boot, and an outwardly-curved wall connecting said boot and cap, for the purpose specified.

11. The combination, with a drill-boot and an integral cap thereon, a drill-disk, a ball-bearing therefor interposed between said disk and cap and covered by the latter, substantially as described.

12. The combination, with a drill-boot and a cap formed integral therewith, of a drill-disk, a ball-bearing therefor interposed between said disk and cap and concealed by the latter, and cleaning edges provided on said boot and arranged to clean the up and down sides of said disk.

In witness whereof I have hereunto set my hand this 7th day of September, 1903.

OCTAVE A. POIRIER.

In presence of—
  RICHARD PAUL,
  S. V. GRIFFIN.